US008805600B2

(12) United States Patent
Sghairi et al.

(10) Patent No.: US 8,805,600 B2
(45) Date of Patent: Aug. 12, 2014

(54) FLIGHT CONTROL SYSTEM AND AIRCRAFT COMPRISING IT

(75) Inventors: Manel Sghairi, Toulouse (FR); Patrice Brot, Ramonville Saint-Agne (FR); Jean-Jacques Aubert, Pibrac (FR); Agnan De Bonneval, Labege (FR); Yves Crouzet, Ramonville Saint Agne (FR)

(73) Assignees: Airbus Operations S.A.S., Toulouse (FR); Le Centre National de la Recherche Scientifique (CNRS), Paris (FR)

( * ) Notice: Subject to any disclaimer, the term of this patent is extended or adjusted under 35 U.S.C. 154(b) by 546 days.

(21) Appl. No.: 12/690,510

(22) Filed: Jan. 20, 2010

(65) Prior Publication Data

US 2010/0204853 A1 Aug. 12, 2010

(30) Foreign Application Priority Data

Feb. 10, 2009 (FR) ...................................... 09 50830

(51) Int. Cl.
*G06F 7/00* (2006.01)
*B64C 13/50* (2006.01)
*G05D 1/00* (2006.01)

(52) U.S. Cl.
CPC ............ *B64C 13/503* (2013.01); *G05D 1/0077* (2013.01)
USPC .................................................. 701/3; 701/11

(58) Field of Classification Search
CPC .. B64C 13/503; B64D 45/00; B64D 45/0005; B64D 45/0015; B64D 45/02; B64D 45/04; B64D 45/06; B64D 45/08; G01C 23/005; G05B 9/03; G05D 1/0077; G06F 11/00; G06F 11/002; G06F 11/004; G06F 11/006; G06F 11/008; G06F 11/07; G06F 11/0703; G06F 11/0706; G06F 11/0709; G06F 11/0712; G06F 11/0715; G06F 11/0718; G06F 11/0721; G06F 11/0724; G06F 11/0727; G06F 11/073; G06F 11/0733; G06F 11/0736; G06F 11/0739; G06F 11/0796; G06F 11/08
USPC ........................................................ 701/3–18
See application file for complete search history.

(56) References Cited

U.S. PATENT DOCUMENTS

2003/0195673 A1* 10/2003 Foch et al. ........................ 701/3
2004/0195460 A1* 10/2004 Sailer ............................. 244/194

(Continued)

FOREIGN PATENT DOCUMENTS

DE 39 06846 A1 9/1990
FR 2 927 308 8/2009

OTHER PUBLICATIONS

U.S. Appl. No. 13/130,319, filed May 9, 2011, Brot.

(Continued)

*Primary Examiner* — Mary Cheung
*Assistant Examiner* — Jerrah Edwards
(74) *Attorney, Agent, or Firm* — Oblon, Spivak, McClelland, Maier & Neustadt, L.L.P.

(57) ABSTRACT

A flight control system includes at least one actuator for a mobile flight surface of an aircraft, and a flight control module in communication with the actuator. The module includes a first and a second computer. Each computer calculates a control command established according to at least one predetermined law for control of the flight surface. The first computer, known as validating computer, comprises logic means adapted for comparing its control command with that of the second computer, known as master computer, and for transmitting the result of the comparison to the actuator. The actuator comprises logic means adapted for deciding, on the basis of the result, to execute or not to execute the command of the master computer. An aircraft comprising such a system is also disclosed.

8 Claims, 4 Drawing Sheets

(56) References Cited

U.S. PATENT DOCUMENTS

2005/0085957 A1 4/2005 Yeh
2006/0100750 A1 5/2006 Platzer et al.
2007/0164166 A1* 7/2007 Hirvonen ................... 244/175
2011/0118906 A1 5/2011 Fervel et al.

OTHER PUBLICATIONS

U.S. Appl. No. 12/688,268, filed Jan. 15, 2010, Sghairi et al.

* cited by examiner

FLIGHT CONTROL SYSTEM AND AIRCRAFT COMPRISING IT

BACKGROUND OF THE INVENTION

1. Field of the Invention

This invention relates to flight control systems (Flight Control Systems) present in aircraft.

2. Discussion of the Background

These flight control systems are at the interface between the flying means (joystick, rudder bar, etc.) and the various mobile flight surfaces of the aircraft (such as the vertical, horizontal rudders, the ailerons, the stabilizers, etc.).

Modern airliners possess "fly by wire"-type flight control systems in which mechanical actions on the flying means are converted into signals transmitted to actuators controlling the movement of the flight surfaces, these commands being transmitted to the actuators by advanced computers.

These commands are calculated according to several types of laws. One of these laws, called normal law, is an assisted-flying law that reprocesses the flying instructions provided by the flying means in order to optimize the flying conditions (comfort of the passengers, stabilization of the airplane, protection of the flight domain, etc). Another law, known as direct law, is a law that only retranscribes the instructions for movement of the airplane transmitted by the electrical flight controls without reprocessing of these signals intended to improve flying performances.

There already is known, as illustrated on FIG. 1, a flight control system 1 comprising a control module 2 having two sets of computers 4 and 5 so as to determine the control commands to be transmitted to actuators 3.

Set 4 comprises two computers 4-1 and 4-2 capable of calculating the control of actuators 3 established according to the normal and direct control laws (these computers are called primary computers) and a computer 4-3 only capable of calculating this control established according to the direct law (this computer is called secondary computer).

Set 5 comprises a primary computer 5-1 and two secondary computers 5-2 and 5-3.

All these computers are installed in an avionic bay and communicate with the actuators via direct point-to-point analog links.

The actuators are connected to one or two computers, with in the case of two computers a "master/hold" architecture; the master computer ascertains the validity of the control signal transmitted to the actuator which ensures the integrity of the device. When the master computer breaks down, the computer "on hold" takes over, which ensures that a computer is always available.

In order to ascertain the validity of its command, each computer has a dual calculation unit structure (it concerns dual-path computers also called "duplex" computers), not illustrated on FIG. 1.

The first unit is a control (COM) unit which implements the processing necessary for carrying out the functions of the computer, namely determining a control signal to an actuator.

The second unit is a surveillance or monitoring (MON) unit which for its part performs the same types of operations, the values obtained by each unit then being compared and, if there is a discrepancy that exceeds the authorized tolerance threshold, the computer is automatically disabled. It then becomes inoperative and is declared out of order so that another computer can substitute for it in order to implement the functions abandoned by this out-of-order computer.

In this way each computer is designed to detect its own breakdowns and to inhibit the corresponding outputs, while indicating its condition.

The hardware of the primary and secondary computers is different so as to minimize the risks of simultaneous failure of the set of computers (hardware dissimilarity).

Moreover, the hardware of the two paths (COM and MON) of each computer is identical, but for reasons of security the software of these two paths is different so as to ensure a software dissimilarity.

SUMMARY OF THE INVENTION

The invention seeks to provide a flight control system that has a modified architecture in comparison with that of the prior art described above, at once less costly in hardware and software resources while meeting the same requirements for security and availability as the system of the prior art.

To this end, it proposes a flight control system for an aircraft comprising:

at least one actuator for a mobile flight surface of the said aircraft;

a flight control module in communication with the said actuator, the said module comprising a first and a second computer, each computer being adapted for calculating a control command established according to at least one predetermined law for control of the said flight surface; characterized in that the said first computer, known as validating computer, comprises logical means adapted for comparing its control command with that of the said second computer, known as master computer, and for transmitting the result of the said comparison to the said actuator, the said actuator comprising logical means adapted for deciding, on the basis of this result, to execute or not to execute the command of the master computer.

Unlike the COM/MON architecture of the prior art, here the validating computer does not decide on its own whether the command of the master is to be transmitted to the actuator, the command of the master is systematically transmitted to the actuator and it is the actuator itself which, by virtue of the logical means that it comprises, decides, according to the result sent back by the validating computer or computers of the master computer, to execute or not to execute the command of the master computer.

Since a decision step is moved to the actuator, that makes it possible to produce simpler and less costly computers while providing a greater flexibility for the layout of the system.

In this way it is possible, in particular, to associate a master computer with several validating computers or else to associate an actuator with several master/validating computer pairs in order to ascertain the reliability of the transmitted command with an increased security.

This flexibility makes it possible in particular to use single-path computers (computers known as "simplex," that is to say devoid of redundant microprocessors) while preserving the same level of security.

According to optional characteristics, the said master computer also comprises the said logic means for comparison.

This makes it possible to make each computer multi-purpose, the functions between master and validating being able to be exchanged at any time according to failures of the computers, which contributes to making the system more flexible and to reducing the total number of computers required.

According to other optional characteristics, the said actuator is in communication with a group of master computers, each master computer being associated with at least one validating computer of a group of validating computers, the said logic means of the said actuator being adapted for selecting the one to be executed from among the commands originating from the said master computers.

The actuator is associated with several master computers in order to maximize the chances that a command originating from a master will be considered as valid and therefore can be reliable.

According to other optional characteristics, the said logic means of the said actuator have a priority architecture.

The master computers connected to the actuator thus are organized in order of priority in such a way that it is the first valid command according to this priority logic that is executed.

According to still other optional characteristics, each validating computer is adapted for calculating the control command according to a program different from that of the master computer with which it is associated.

For the same control law, the software dissimilarity for the calculation of a command between master and validating computers provides an additional security.

According to still other optional characteristics, each computer is adapted for detecting when the computer with which it is associated is calculating the control command according to the same program and if such is the case, for being reconfigured to calculate this control command according to a different program.

In this way the software reconfiguration makes it possible to maximize the use of each computer which contributes to minimizing the total number of computers while preserving, for the same control law, a software dissimilarity between master and validating computers.

According to still other optional characteristics:
the said actuator comprises a control unit and a unit for monitoring the said control unit;
each unit is connected to at least one master computer and to the associated validating computer; and/or
one of the units is only connected to a master computer and the other is only connected to the associated validating computer, the said control and monitoring units also being connected to one another.

The connecting of the control and monitoring units of the actuators with the computers thus can be accomplished directly or indirectly (through the other unit).

In a second aspect, the invention also applies to an aircraft equipped with a system such as explained above.

BRIEF DESCRIPTION OF THE DRAWINGS

The explanation of the invention now will be continued with the detailed description of an exemplary embodiment, provided below in an illustrative but not limitative capacity, with reference to the attached drawings, on which.

DESCRIPTION OF THE PREFERRED EMBODIMENTS

Figure 1:
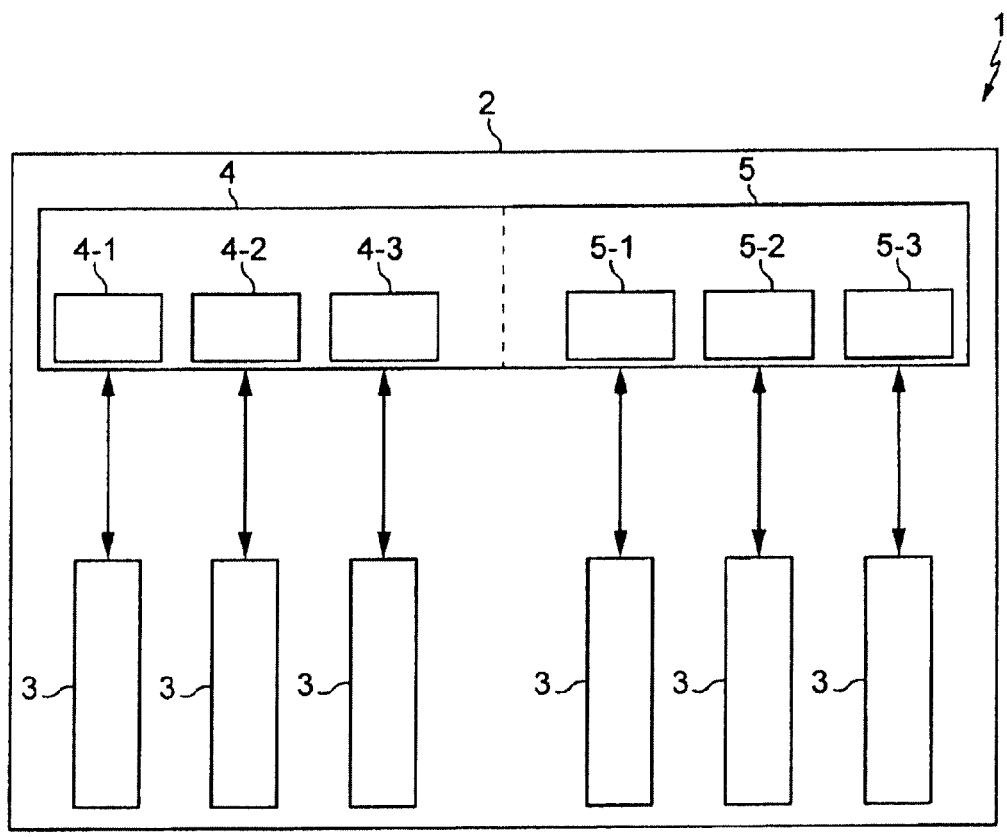
FIG. 1 is a schematic representation of a flight control system according to the prior art described above.
Figure 2:
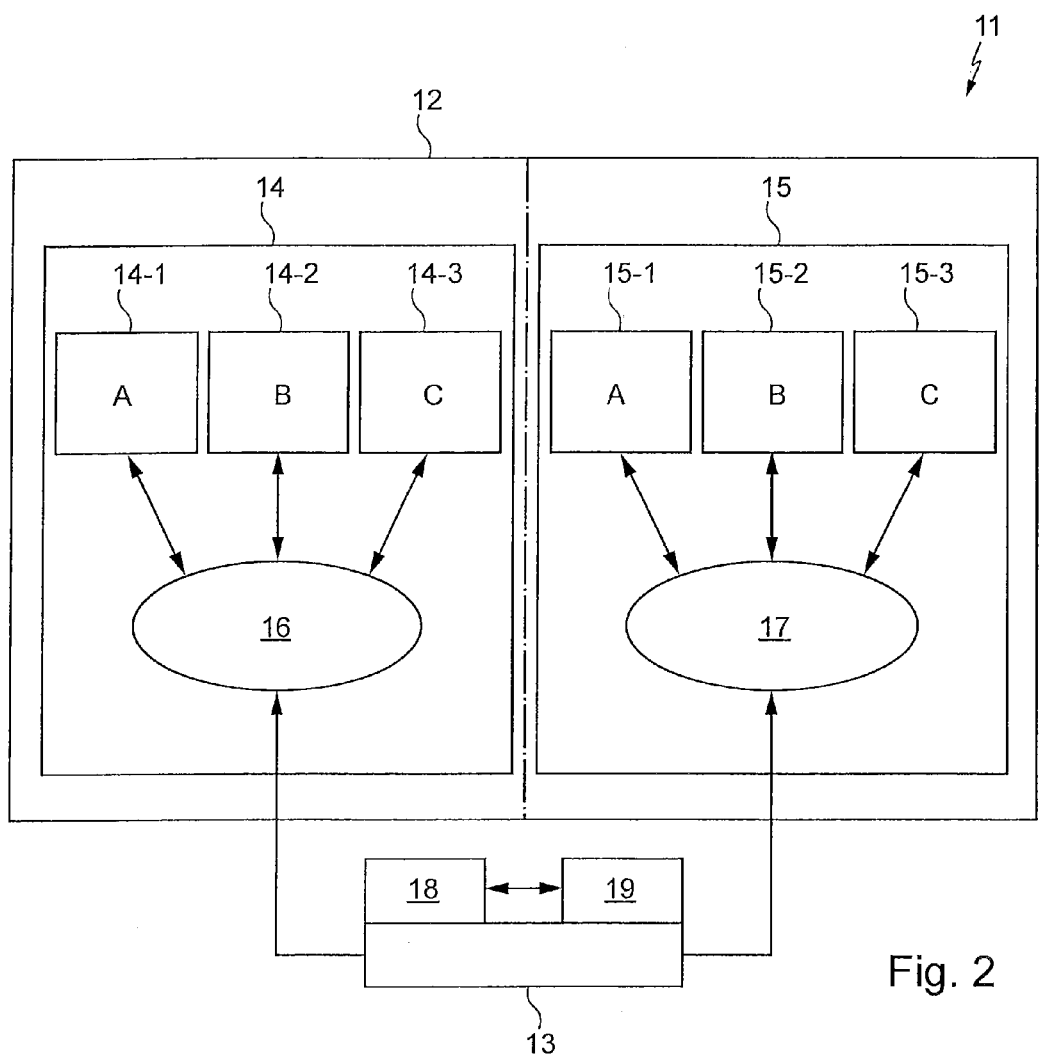
FIG. 2 is a schematic view of a flight control system according to the invention.

The flight control system according to the invention 11 illustrated on FIG. 2 has a control module 12 to transmit commands to a plurality of actuators 13.

Control module 12 comprises six "simplex" computers (they have only one path and a single calculation processor) distributed in two sets 14 and 15 of three computers, each set being connected to each actuator 13.

The set of computers 14 (respectively 15) communicates with actuators 13 through a digital data exchange means 16 (respectively 17) the structure of which will be explained in detail below with the aid of FIGS. 3 and 4.

The set of computers 14 (respectively 15) comprises two primary computers 14-1 and 14-2 (respectively 15-1 and 15-2) making it possible to calculate the control commands according to the normal law and according to the direct law as well as a secondary computer 14-3 (respectively 15-3) for calculating the control commands on the basis of the direct law alone.

The primary and secondary computers are of different hardware design in order to meet security requirements (hardware dissimilarity).

The 14-1 and 14-2 (respectively 15-1 and 15-2) primary computers function with two program variants A and B for calculation according to the normal and direct laws which are different from one another, while computer 14-3 (respectively 15-3) functions for calculation according to the direct law with a program variant C different from variants A and B.

In this way the calculation according to the normal law is obtained by two different programs (A and B) while the calculation according to the direct law also is obtained by two different programs (B and C or A and C or A and B). Software dissimilarity therefore is amply ensured for the determination of the control signals, which ensures a high level of security.

As will be seen below, each computer can be reconfigured on the spot according to failures.

These sets of computers are located in the avionic bay (the avionic bay is the space in which most of the electronic equipment items of an airplane are grouped together, in general situated beneath the useful space of the airplane) and are supplied by two separate electrical systems.

Each actuator 13 comprises two paths 18 and 19 (COM path and MON path) connected to two sets of computers 14 and 15 in such a way that each actuator communicates through its paths 18 and 19 with all the computers.

Path 18 (COM control unit) performs the functions of selection of the command to be executed and path 19 (MON monitoring unit) for its part carries out the same types of operations so that at the output the values obtained by each unit are compared and, in the event of disagreement, the actuator is disabled.

In the architecture of the control system according to the invention, called priority architecture, all the computers generate control commands for the mobile flight surfaces with each computer that plays the role of master computer for one group of actuators and the role of validating computer for the other actuators.

Each master computer is associated with one or more validating computers and each actuator is associated with one or more masters.

In the case in which the actuator has several masters, the latter are classified according to a priority logic explained below in order to define the master at any moment.

Each computer transmits the flight surface commands to the actuators for which it is master and to all the other computers. Each "validating" computer compares its command with the command of the master computer for the actuators for which it is not itself master and, if the result of the comparison is positive (command of the master validated), the validating computer transmits this information to the actuators concerned. Each actuator therefore receives one or more commands as well as the corresponding validities originating from validating computers (in the illustrated example computers 14-2, 14-3 and 15-1 to 15-3). The control performed by the actuator then is carried out in three steps.

According to the first step, unit 18 (respectively unit 19) receives commands from all the master computers controlling the actuator under consideration (in the illustrated example computers 14-1 to 14-3 and 15-1 and 15-2 are master computers for the actuator). Unit 18 (respectively 19) chooses the command to be applied according to a priority logic an example of which is synthesized by the table shown below:

| Priorities | Master Computer | Validating Computer | Level of laws |
|---|---|---|---|
| 7 | Computer 14-1 | Computer 14-2 or Computer 15-2 | Normal Law |
| 6 | Computer 15-1 | Computer 14-2 or Computer 15-2 | Normal Law |
| 5 | Computer 14-1 | Computer 15-1, after reconfiguration of this computer with software B | Normal Law |
| 4 | Computer 14-2 | Computer 15-2, after reconfiguration of this computer with software A | Normal Law |
| 3 | Computer 14-2 | Computer 14-3 or Computer 15-3 | Direct Law |
| 2 | Computer 15-2 | Computer 14-3 or Computer 15-3 | Direct Law |
| 1 | Computer 14-3 | Computer 15-3 | Direct Law |

This priority logic takes into account the degradation of the laws, the normal law to be favored in relation to the degraded one (direct law), level 7 corresponding to the highest priority level.

At each priority level, software dissimilarity is preserved between the master computer and its associated validating computer.

According to a second step, unit 18 (respectively 19) is to validate this command on the basis of the information items from the corresponding validating computers. If the command from the selected master is not correctly validated by the validating computers, this command is ignored, and a new master computer is chosen according to the foregoing priority logic.

Finally, and according to a third step, the two units 18 and 19 transmit to all the computers the applied command, the current position of the actuator and the addresses of the current master and validating computers as well as, if need be, of the masters considered as faulty (rejected masters).

At any step, unit 19 (respectively unit 18, is able to cut off unit 18 (respectively unit 19) if it detects a disagreement between the two.

When computer 15-1 sees that computers 14-2 and 15-2 are lost (priority 5), it is reconfigured in software B in order to ensure software dissimilarity for the normal law between it and computer 14-1.

Likewise, when computer 15-2 sees that computers 14-1 and 15-1 are lost (priority 4), it is reconfigured according to software A in order to ensure software dissimilarity for the normal law between it and computer 14-2.

Figure 3:
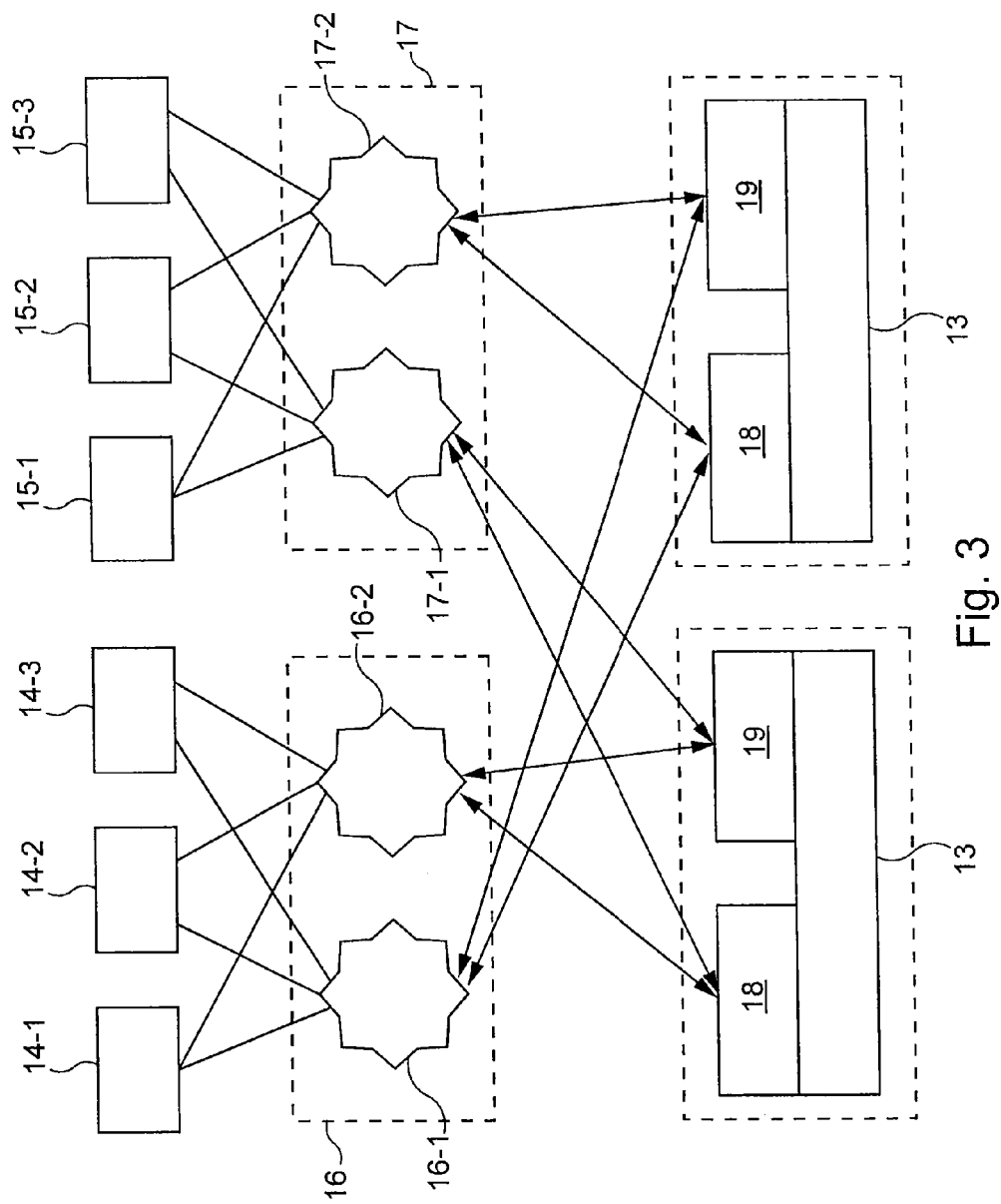
FIG. 3 is a view detailing the communication network allowing the transfer of information from the sets of computers that comprise the system according to the invention to the actuators of this system.

An exemplary communication network between the computers of module 12 and actuators 13 now is going to be described with the aid of FIG. 3.

This network comprises two data exchange means 16 and 17.

Means 16 (respectively 17) comprises two components 16-1 and 16-2 (respectively 17-1 and 17-2), each component comprising a 100 Mbit/s AFDX (Avionics Full Duplex switched Ethernet) bus, situated in the avionic bay or elsewhere in the fuselage of the airplane and connected to a micro-bus (with an output of 10 Mbit/s) situated close to the actuators (these buses are not illustrated on the Figure). These buses have been developed and standardized to meet the standards of the aeronautical field.

The AFDX networks are based on the principle of the switched networks, that is to say that the actuators and the computers in charge of transmission or reception of data are organized around switches through which these data pass in transit.

These networks form a digital link between the computers and the actuators, the multiplexing of the data so obtained making it possible to have each computer easily communicate with each actuator (which was not the case with the device of the prior art where the links between the computers and the actuators were point-to-point analog links).

Each means 16 and 17 is connected to each unit 18 and 19 of each actuator 13, so that each unit 18 and 19 is connected directly with each computer by the AFDX buses and the micro-buses.

Figure 4:
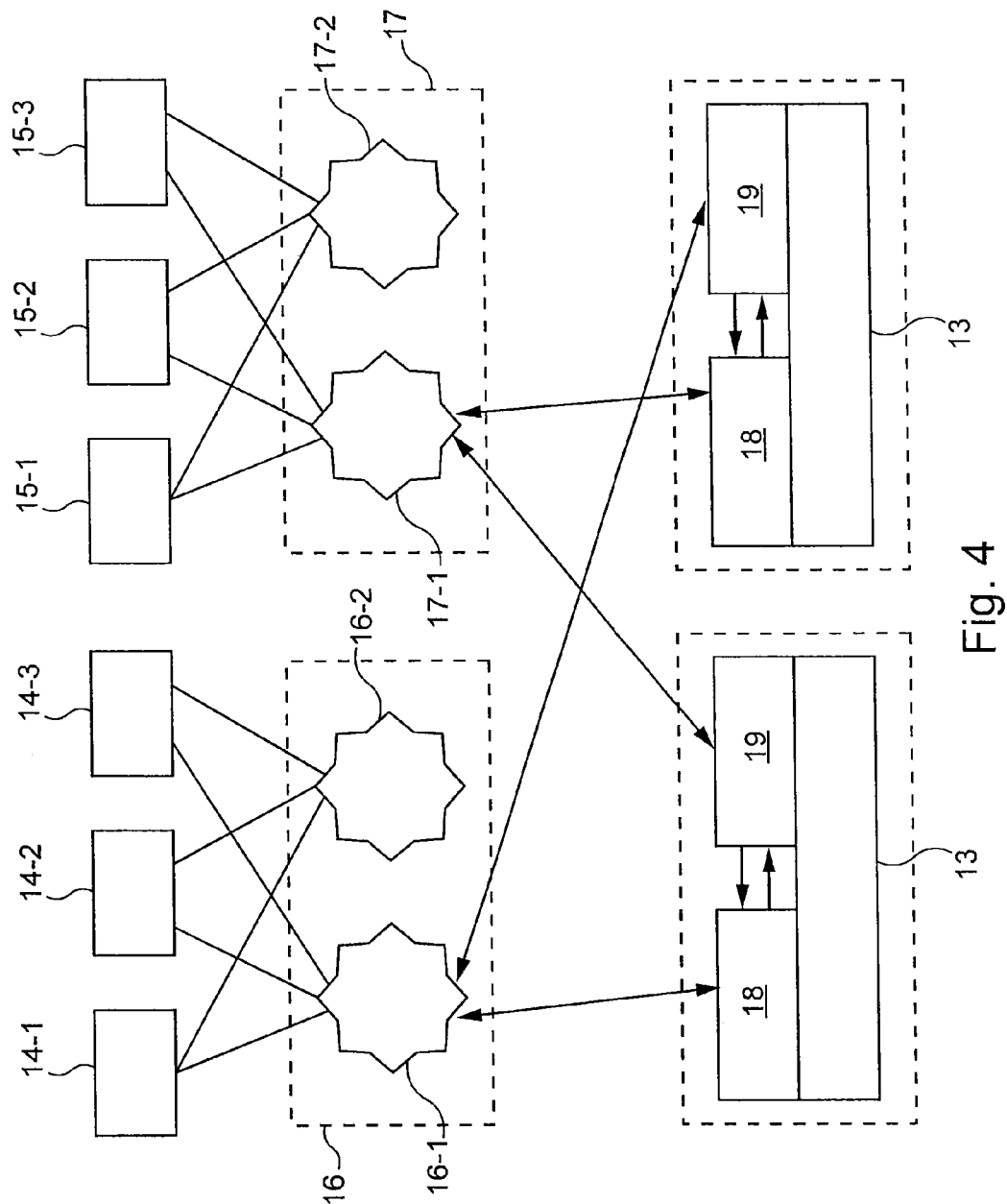
FIG. 4 is a view similar to FIG. 3 but for a variant of the communication network.

In a variant illustrated in FIG. 4, unit 18 of each actuator is only connected to one of the sets of computers while unit 19 is connected to the other of the sets of computers, with units 18 and 19 which are connected to one another in such a way that unit 18 can communicate with the set of computers to which it is not directly connected through unit 19 and vice versa.

As a variant, units 18 and 19 of each actuator can share the same medium in order to communicate with the computer, by using so-called application CRC (Cyclic Redundancy Check), for signing their messages.

It also is possible to use other types of buses such as ARINC (Aeronautical Radio Incorporated) buses or any other type of communication means allowing a digital multiplexing, between the computers and the actuators provided that these are compatible with the standards in the aeronautical field.

In still another variant, it is not the normal and direct laws that are implemented in the computers, but any other type of law such as, for example, a law that, unlike the direct law, would be only partially degraded in relation to the normal law (following the loss of sensor signals from the airplane, for example).

Finally, it will be recalled that the number of computers can be varied according to needs and is not restricted to the number described in the examples illustrated in FIGS. 2 to 4.

Numerous other variants are possible according to circumstances, and in this connection it is recalled that the invention is not limited to the examples described and shown.

The invention claimed is:

1. A flight control system for an aircraft, the system comprising:
at least one actuator for a mobile flight surface of the aircraft; and
a flight control module in communication with the actuator, the module comprising a first computer and a second computer, each computer being adapted for calculating a control command established according to at least one predetermined law for control of the flight surface, the first computer, known as validating computer, comprises a first logic section that compares the control command calculated by the first computer with the control command calculated by the second computer, known as master computer, and transmits the result of the comparison to the actuator, and the actuator comprises a second logic section that decides, on the basis of the result, to execute or not to execute the control command calculated by the master computer, and wherein the actuator is in communication with a group of master computers, each master computer being associated with at least one validating computer of a group of validating computers, and the second logic section of the actuator being further adapted for selecting a command to be executed from among commands originating from the master computers, and wherein the second logic section of the actuator has a priority architecture.

2. The system according to claim 1, wherein the master computer further comprises a third logic section that compares the control command calculated by the second computer with the control command calculated by the first computer, and transmits the result of the comparison to the actuator.

3. The system according to claim 1, wherein each of the validating computers is adapted for calculating a control command according to a program different from a program used by the one of the master computers with which it is associated.

4. The system according to claim 1, wherein each computer is adapted for detecting when the computer with which it is associated is calculating the control command according to the same program and if such is the case, for being reconfigured in order to calculate the control command according to a different program.

5. The system according to claim 1, wherein the actuator comprises a control unit and a monitoring unit for the control unit.

6. The system according to claim 5, wherein each control unit and monitoring unit is connected to at least one master computer and to the associated validating computer.

7. The system according to claim 5, wherein one of the monitoring unit and the control unit is only connected to a master computer and the other one of the monitoring unit and the control unit is only connected to the associated validating computer, and the control and monitoring units are also connected to one another.

8. An aircraft equipped with a flight control system, the system comprising:

at least one actuator for a mobile flight surface of the aircraft; and a flight control module in communication with the actuator, the module comprising a first and a second computer, each computer being adapted for calculating a control command established according to at least one predetermined law for control of the flight surface, the first computer, known as validating computer, comprises a first logic section that compares the control command calculated by the first computer with the control command calculated by the second computer, known as master computer, and transmits the result of the comparison to the actuator, and the actuator comprises a second logic section that decides, on the basis of the result, to execute or not to execute the control command calculated by the master computer, and wherein the actuator is in communication with a group of master computers, each master computer being associated with at least one validating computer of a group of validating computers, and the second logic section of the actuator being further adapted for selecting a command to be executed from among commands originating from the master computers, and wherein the second logic section of the actuator has a priority architecture.

\* \* \* \* \*